United States Patent Office 3,364,269
Patented Jan. 16, 1968

3,364,269
CONTINUOUS PRODUCTION OF HEXACHLORO-
CYCLOPENTADIENE
Manfred Minsinger, Ludwigshafen (Rhine), Germany, assignor to Badische Anilin- & Soda-Fabrik Aktiengesellschaft, Ludwigshafen (Rhine), Germany
No Drawing. Continuation-in-part of application Ser. No. 108,761, May 9, 1961. This application Apr. 15, 1965, Ser. No. 448,246
Claims priority, application Germany, May 13, 1960, B 57,833
4 Claims. (Cl. 260—648)

This is a continuation-in-part of my application Ser. No. 108,761, filed May 9, 1961, now abandoned.

This invention relates to an improved process for the production of hexachlorocyclopentadiene by which this compound can be obtained in good yields and in a simple manner on an industrial scale. More particularly, the invention relates to an improvement in the continuous commercial production of the known compound from known initial materials in the presence of specific solid catalysts.

It is known that hexachlorocyclopentadiene is obtained when aliphatic hydrocarbons with five carbon atoms are treated with at least the calculated amount of chlorine at temperatures of at least 200° C. in the presence or absence of catalysts. Porous substances, such as pumice or active carbon, light (cf. Austrian patent specification No. 162,583) as well as gaseous organic or inorganic substances or organic or inorganic substances which are vaporous at the reaction temperatures, as for example amides, nitriles, amines or oxides of nitrogen, nitryl chloride or nitrosyl chloride (cf. U.S. patent specification No. 2,945,893) have already been used as catalytically active media. When using gaseous or vaporous catalysts, quite satisfactory results are obtained as regards the yields of hexachlorocyclopentadiene, whereas when working without catalysts or with rigidly arranged porous solid catalysts, for example active carbon, it has not been possible to achieve results which would permit industrial application of the process. It has been found, for example, that in the process described in Austrian patent specification No. 162,583 yields of the order of 20% are obtained when using rigidly arranged active carbon as the catalyst and working at about 500° C. The search for more suitable solid catalysts led to the discovery that by using barium sulfate as catalyst the yield of hexachlorocyclopentadiene is increased to about 70% (cf. U.S. patent specification No. 2,795,622).

In accordance with other processes known in the art the reaction is not carried out at one definite temperature but rather at rising temperatures in several distinct reaction stages at different temperatures. Thus, for example, U.S. patent specification No. 2,650,942 describes a process in which vaporous $C_5$ polychlorohydrocarbons are reacted in a reaction zone which contains in the front portion a porous solid catalyst, the temperature in the front portion being between 300° and 430° C. and that in the rear portion of the reaction zone being between 450° and 525° C. The said porous catalyst can be rigidly arranged or fluidized.

This process is in accordance with the knowledge of thermodynamic investigations described in J. Appl. Chem. (U.S.S.R.) 31 (1958), pp. 1567 to 1573, according to which, of the various intermediate stages through which the reaction proceeds, only the last stage, consisting in the splitting off of chlorine from octachlorocyclopentene, is promoted by the use of very high temperatures, whereas for all the other intermediate stages lower temperatures are especially advantageous.

It is an object of the present invention to provide a process which can be carried out more simply and easily on an industrial scale than the method adopted for large scale production on the basis of recent knowledge of the course of the reaction, and nevertheless with good yields. Another object of the invention is to provide a process for the continuous production of hexachlorocyclopentadiene which in spite of good yields does not exhibit the disadvantage of the known method using the recent knowledge of the thermodynamic course of the reaction.

I have found that the said objects are achieved and hexachlorocyclopentadiene is obtained in good yields by reaction of hydrocarbons with five carbon atoms in the vapor phase with chlorine at an elevated temperature in the presence of solid catalysts, by carrying out the reaction in only one fluidized layer of a carbon particle catalyst at a substantially uniform temperature between 350° and 600° C., preferably between 430° and 540° C.

Suitable initial hydrocarbons are aliphatic and cycloaliphatic hydrocarbons with five carbon atoms which may be saturated or olefinically unsaturated. Suitable compounds, which may also be used in admixture with each other and which have already been used as initial materials for the reaction with chlorine to form hexachlorocyclopentadiene, include n - pentane, 2 - methylbutane, neopentane, pentene - (1), pentene - (2), 2-methylbutene - (1), isoprene, pentadiene - (1,3), cyclopentane, cyclopentene and cyclopentadiene. Instead of monomeric cyclopentadiene, dicyclopentadiene can also be directly used because this dissociates into cyclopentadiene at the reaction temperatures. Mixtures of $C_5$-hydrocarbons, such as are obtained in petrochemical processes, are also suitable starting materials. The yields, it is true, are less good than when using n - pentane; however, this is compensated by the fact that such mixtures are particularly cheap.

To carry out the process, the reaction components are forced in gaseous or vaporous phase into the reaction vessel charged with finely grained catalyst in such a way that the catalyst is kept in whirling and rolling motion and assumes a state similar to that of a boiling liquid.

An especially suitable catalyst is active carbon. The grain size in which the catalyst is used depends on the dimensions of the reaction vessel, the gas load and the dumped height of the catalyst. It is advantageous to choose a grain size between about 0.1 mm. and 2 mm. preferably between 0.1 mm. and 1 mm., and a dumped height of between about 0.5 and 3 meters. The effective gas speeds for fluidization are then in general from about 5 to 100 cm./second.

Chlorine is preferably used in the amount theoretically necessary. It is advantageous to use about 1 to 1.3 times the theoretical amount. The amount of chlorine theoretically necessary is different for the different $C_5$-hydrocarbons and is for example 6 mols of chlorine per mol of cyclopentadiene and 9 or 7 mols of chlorine per mol n - pentane or isoprene. In general, the molar ratio of hydrocarbon to chlorine is about 1:6 to 1:12, preferably about 1:6 to 1:10. However, considerably larger amounts of chlorine, for example 12 to 25 mols of chlorine per mol of hydrocarbon, still give good yields. To use considerably less than the amount of chlorine theoretically necessary is inadvisable because then the reaction remains incomplete. When an excess of chlorine is used, the unreacted portion can easily be returned to the process.

It is especially advantageous to add diluents to the chlorine and/or to the vaporous initial hydrocarbon or chlorohydrocarbon. Examples of suitable diluents are inert gases, such as rare gas or especially nitrogen, or vaporous substances, especially hydrogen chloride. By the coemployment of diluents the strongly exothermic reaction is moderated and the desired reaction temperature is easy to maintain about constant or substantially uniform throughout the whole catalyst layer. As a rule, the amount of diluent, when such is coemployed, is such that the molar proportion of diluent to chlorine and hydrocarbon is between about 0.8 and 4 to 1, especially between 0.8 and 2 to 1. The reaction heat may also be withdrawn by indirect cooling or by the simultaneous use of diluents and indirect cooling.

Fluidization of the finely divided catalyst can be effected by blowing the diluted or undiluted reactants in vapor form upwardly through a grate bearing the particles of catalyst. Fluidization may also be effected by leading gaseous or vaporous substances, either separately or mixed, into the layer of catalyst through one or more jets projecting into the catalyst zone. The jets may be arranged annularly, at the same height or preferably one above the other.

The chlorine and the vapor of the hydrocarbon to be reacted may be introduced into the reaction zone separately or as a mixture. It has proved to be especially advantageous to introduce the chlorine upwardly through the grate and the hydrocarbon above the grate through jets into the reaction zone filled with fluidized catalyst particles.

The process is carried out at temperatures of 350° to 600° C. It is convenient to work at a temperature between about 400° and 580° C., especially between 430° and 540° C., the preferred temperatures being between 430° and 480° C. The catalysts may be heated up indirectly, for example by external heating, or directly by hot gases, for example those used for fluidization, or by means of electrical heating wires. Since the reaction is exothermic, supply of heat is not necessary after the reaction has been initiated. In general, provision must even be made for a withdrawal of heat, especially when large reaction vessels are used. Since the gaseous and vaporous initial materials rapidly heat up in the reaction zone to the reaction temperature, it is not necessary to preheat them to the reaction temperature prior to their entry into the zone. As a rule, therefore, the chlorine is introduced into the reaction zone in gaseous form at room temperature and the hydrocarbon vapor after heating to not appreciably above the boiling temperature, for example 5° to 30° C. above the same. Instead of in vapor form, the hydrocarbon may also be injected or atomized in liquid form into the fluidized layer of catalyst where it vaporizes immediately. The reaction vessel, which may consist for example of a vertical tube, conveniently of quartz or ceramic material, such as porcelain or firebrick, or of nickel or alloy steel, may be cooled either externally or internally. If desired, working may be at a few atmospheres above atmospheric pressure, for example at 2 to 7 atmospheres.

Certain losses of catalyst, occasioned by the formation of flue dust, can be compensated for by adding fresh catalyst without the need for interrupting operation. Another possibility of replacing the used catalyst by fresh catalyst is to withdraw from the lower part of the fluidized layer, for example a short distance above the grate, part of the catalyst, for example one-tenth to one-fifth, either periodically or continuously, and introducing a similar amount of fresh catalyst into the reaction vessel, for example from the top.

The vapors withdrawn from the reaction vessel are worked up in the usual way; it is advantageous first to pass the vapors through a dust separator, for example a cyclone, in order to free them from any entrained amounts of catalyst, and then to cool the vapors to condense the hexachlorocyclopentadiene. The crude hexachlorocyclopentadiene obtained can as a rule be directly processed, for example into flame-retardant polyesters, plasticizers or pesticides. If desired, it may be further purified by distillation or recrystallization.

Part of the substances which remain gaseous after the hexachlorocyclopentadiene has been separated from the reaction mixture may be returned to the reaction vessel.

The invention is illustrated by, but not limited to, the following examples.

*Example 1*

170 liters (NTP) of nitrogen and 36 grams of n-pentane as a vapor at 40° C. are led per hour at 460° C. through a vertical ceramic tube which has a diameter of 60 mm. and a length of 1200 mm. and is charged with 2 liters of active carbon with a grain size of 0.2 to 0.4 mm., the gases being introduced from below through a perforated bottom plate. At the same time, 108 liters (NTP) of gaseous chlorine are introduced, also through the bottom plate. By the gaseous and vaporous substances introduced, the catalyst is fluidized to a height of about 1000 mm. The vapors ascending in the tube are led, after passing through the tube, into a cyclone where they are freed from any entrained flue dust. Then they are led through a condenser in which they are cooled to about 20° C. The condensed portion is collected in a receiver. 136 to 137 grams of crude hexachlorocyclopentadiene are obtained per hour, containing about 1% by weight of octachlorocyclopentene and 98% by weight of hexachlorocyclopentadiene as well as about 1% by weight of residue. With reference to the amount of n-pentane supplied per hour, the yield of hexachlorocyclopentadiene is 99% with a 100% conversion.

*Example 2*

60 liters (NTP) per hour of nitrogen and 140 liters (NTP) of chlorine are led at 430° C. through a vertical quartz tube which has a diameter of 60 mm. and a length of 1200 mm. and is charged with 2 liters of active carbon with an average grain size of 0.4 mm., the gases being introduced from below through a perforated bottom plate. Through a nozzle arranged above the said bottom plate, 100 liters (NTP) per hour of nitrogen and 72 g. of cyclopentadiene in the form of vapor obtained by heating dicyclopentadiene to 300° C. are introduced into the tube at the same time. By the gaseous and vaporous substances introduced, the catalyst is fluidized to a height of about 1000 mm. The vapors ascending in the tube are passed through a cyclone as described in Example 1 and then cooled to about 20° C. About 240 to 260 g. per hour of condensate are obtained which contains 77% by weight of hexachlorocyclopentadiene and less than 1% by weight of octachlorocyclopentene, the remainder being tetrachloroethylene, trichloroethylene and hexachlorobutadiene.

*Example 3*

The same apparatus and the same carbon charge as described in Example 2 are used. By introducing through the perforated bottom plate at 520° C. 80 liters (NTP) per hour nitrogen and 110 liters (NTP) of chlorine and, at the same time, through the nozzle provided above the perforated bottom plate, 36 g. of a mixture of $C_5$-hydrocarbon isomers (analysis see below) and 150 liters (NTP) of nitrogen, 100 to 105 g. per hour of condensate are obtained which contains 36% by weight of hexachlorocyclopentadiene. Analysis by gas chromatography of the mixture of $C_5$-isomers:

| | Vol. percent |
|---|---|
| i-Pentane | 6.93 |
| n-Pentane | 9.43 |
| Methylbutane | 0.06 |
| 1-pentene | 6.84 |
| 2-methyl-1-butene | 7.72 |
| 2-pentene (trans) | 5.28 |
| 2-pentene (cis) | 2.68 |
| 1,4-pentadiene | 2.38 |
| 2-methyl-2-butene | 7.80 |
| Cyclopentane | 0.46 |
| Isoprene | 32.14 |
| Cyclopentene | 3.90 |

| | Vol. percent |
|---|---|
| 1,3-pentadiene (trans) | 10.05 |
| 1,3-pentadiene (cis) | 3.72 |
| Cyclopentadiene | 0.61 |

*Example 4*

By working as described in Example 3 but at a reaction temperature of 460° C., 130 to 135 g. of condensate are obtained per hour, 70% by weight being hexachlorocyclopentadiene.

By working in the same way but at a reaction temperature of 430° C., 130 to 135 g. of condensate with a content of 52% by weight of hexachlorocyclopentadiene are obtained per hour.

*Example 5*

The apparatus described in Example 2 is charged with 1.5 liters of active carbon with a grain size of 0.2 to 0.4 mm. 100 liters (NTP) per hour of nitrogen and 150 liters (NTP) of chlorine are then introduced from below through the perforated bottom plate and, simultaneously, 36 g. per hour of vaporous isopentane in admixture with 150 liters (NTP) of nitrogen through the nozzle above the bottom plate. The reaction temperature is 400° C. 130 to 135 g. of condensate containing 58% by weight of hexachlorocyclopentadiene are obtained per hour.

By following the same procedure, but working at 450° C., 145 g. condensate containing 71% by weight of hexachlorocyclopentadiene are obtained with a 100% conversion.

*Example 6*

In the manner described in Example 2, 100 liters (NTP) per hour of hydrogen chloride and 120 liters of chlorine are introduced into the reaction tube which has been heated to 460° C. At the same time, 36 g. of a vaporous mixture of $C_5$-hydrocarbon isomers diluted with 150 liters (NTP) of hydrogen chloride are introduced through the nozzle above the bottom plate. 135 to 140 g. of condensate containing 53% by weight of hexachlorocyclopentadiene are obtained per hour.

By working in the same way, but introducing through the nozzle 36 g. per hour of vaporous n-pentane at 100° C. instead of the mixture of $C_5$-hydrocarbon isomers, 133 to 136 g. of condensate containing 47% by weight of hexachlorocyclopentadiene are obtained per hour.

*Example 7*

A vertical tube of the type specified in Example 2 is used, which is charged with active carbon having an average grain size of 0.4 mm. 40 liters (NTP) per hour of nitrogen and 240 liters (NTP) of chlorine are introduced at 460° C. from below through the perforated bottom plate. Simultaneously, 80 liters (NTP) per hour of nitrogen and 72 g. of a vaporous mixture of $C_5$-hydrocarbon isomers are introduced through the nozzle. The vapors ascending in the tube are supplied to a cyclone, where they are freed from entrained flue-dust, and are then cooled to 20° C. in a cooler.

The condensed portions are collected in a receiver. 215 to 220 g. of condensate containing 52% by weight of hexachlorocyclopentadiene are obtained per hour.

*Example 8*

The apparatus described in Example 2 is charged with 1.8 liters of active carbon having a grain size of 0.2 to 0.4 mm. 60 liters (NTP) per hour of nitrogen in admixture with 140 liters (NTP) of chlorine are introduced through the bottom plate and, simultaneously, 120 liters (NTP) of nitrogen in admixture with 32 g. of cyclopentadiene vapor through the nozzle. 125 to 130 g. of condensate containing 77% by weight of hexachlorocyclopentadiene are obtained per hour. The remainder is hexachlorobutadiene, tetrachloroethylene and octachlorocyclopentene.

I claim:

1. A process for production of hexachlorocyclopentadiene which comprises reacting in a reaction zone chlorine and a hydrocarbon in the vapor phase, said hydrocarbon being selected from the group consisting of cyclopentane, cyclopentene, cyclopentadiene, dicyclopentadiene, saturated or olefinically unsaturated aliphatic hydrocarbons with five carbon atoms and mixtures of these compounds, in a single fluidized catalyst layer of carbon particles at a substantially uniform temperature between 350° C. and 600° C., thereby producing in said zone hexachlorocyclopentadiene, withdrawing said hexachlorocyclopentadiene in the vapor phase from said zone, and condensing the withdrawn hexachlorocyclopentadiene.

2. A process as claimed in claim 1, wherein the temperature in the fluidized layer lies between 430° and 540° C.

3. A process as claimed in claim 1, wherein a diluent selected from the group consisting of nitrogen, hydrogen chloride and mixtures of these substances is used in the reaction.

4. A process as claimed in claim 1, wherein the particle size of the fluidized catalyst is between 0.1 and 2 mm.

References Cited

UNITED STATES PATENTS 2,650,942   9/1953   Maude et al. _____ 260—648

FOREIGN PATENTS 162,583   3/1949   Austria.

OTHER REFERENCES

Morrison et al., "Organic Chemistry," pp. 80 to 83 (1959).

Kogan, "J. App. Chem. U.S.S.R.," vol. 31, No. 7, pp. 1567–1573 (1958).

LEON ZITVER, *Primary Examiner.*

DANIEL D. HORWITZ, *Examiner.*

M. JACOB, *Assistant Examiner.*